United States Patent
Havener et al.

[11] 3,802,758
[45] Apr. 9, 1974

[54] DUAL HOLOGRAM PLATE HOLDER

[75] Inventors: Albert G. Havener, Boca Raton, Fla.; Roger J. Radley, Jr., Red Creek, N.Y.

[73] Assignee: The United States of America as represented by the Secretary of the Air Force, Washington, D.C.

[22] Filed: May 21, 1973

[21] Appl. No.: 362,153

[52] U.S. Cl............... 350/3.5, 95/50, 355/52, 356/106
[51] Int. Cl............... G02b 7/00, G01b 9/02
[58] Field of Search ........... 350/3.5; 95/50; 355/52; 356/106, 109; 33/184.5

[56] References Cited
UNITED STATES PATENTS

| | | | |
|---|---|---|---|
| 3,583,784 | 6/1971 | Hanna | 350/3.5 |
| 3,182,577 | 5/1965 | Ohnaka | 95/50 |
| 2,664,781 | 1/1954 | Waller | 355/52 |

OTHER PUBLICATIONS

Fetcinko et al., IBM Technical Disclosure Bulletin Vol. 13, No. 3, Aug. 1970, p. 721.

Primary Examiner—Ronald J. Stern

[57] ABSTRACT

Apparatus for holding and precisely positioning the two holograms used in dual hologram interferometry. Each hologram can be adjusted in position relative to the other and relative to the reference beam with six degrees of freedom: three translational along three orthogonal axes and three rotational about these axes. Adjustments are accomplished by piezoelectric micrometers having a resolution of 40 angstroms.

2 Claims, 8 Drawing Figures

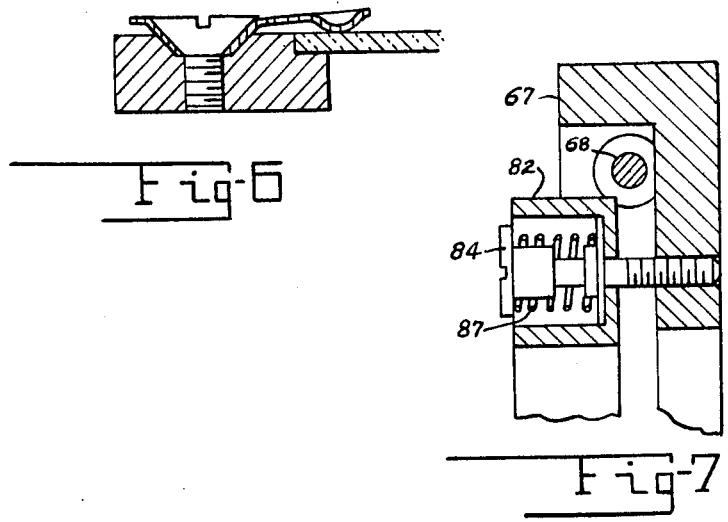
Fig-6
Fig-7
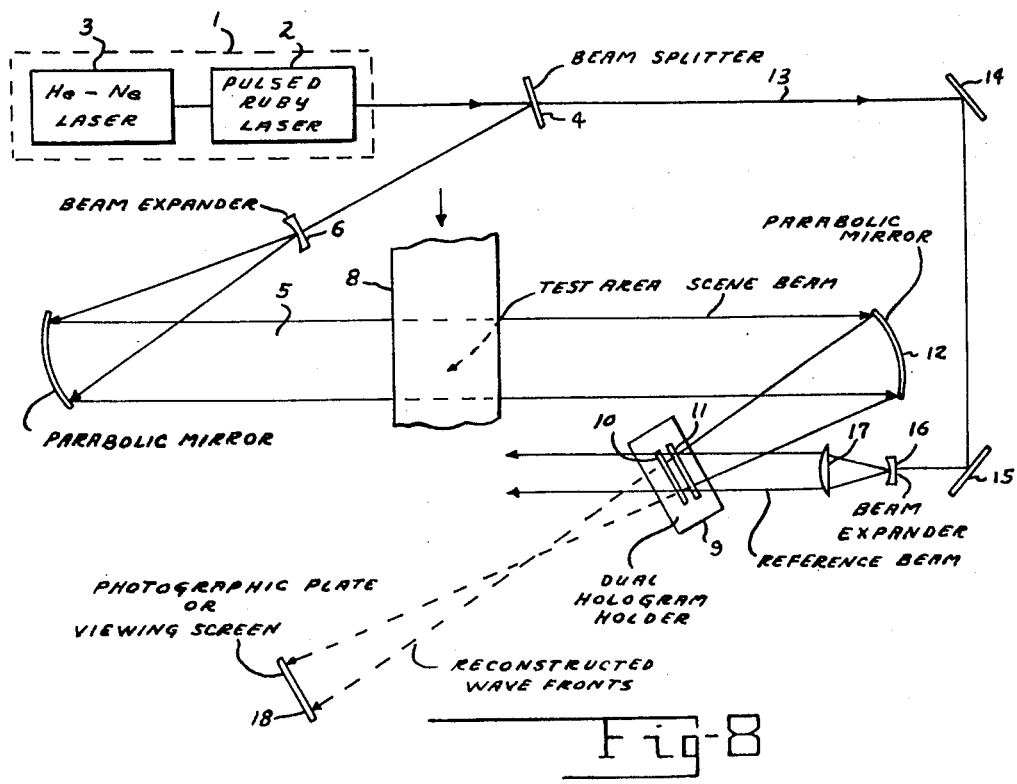
Fig-8

3,802,758

DUAL HOLOGRAM PLATE HOLDER

BACKGROUND OF THE INVENTION

The invention is in the field of holographic interferometry, particularly of the type in which the interference pattern results from interference between reconstructed wave-fronts formed by two illuminated holograms of a subject made at different times and under different conditions.

Interferometry of the above type employing a double-exposed hologram has been known for some time and is described in the literature, for example, in an article entitled "*Advances in Holography*" by K. S. Pennington appearing in "*Scientific American*", February 1968, pages 44–45. In the double exposure technique a photographic plate is first exposed with the subject in a reference state. The subject, for example, may be an aerodynamic body in a wind tunnel and it may be desired to investigate the airflow over the body at hypersonic speeds. The reference state in this case would be that of no airflow through the tunnel. The same photographic plate is then exposed a second time with the subject in its test state, i.e., with air flowing through the tunnel at the desired velocity. The plate is then developed to produce two superimposed holograms on the same plate. Illumination of the superimposed holograms produces two reconstructed wave fronts which interfere in a pattern that may be recorded photographically to produce an interferogram which shows by the arrangement of its fringes the refractive index distribution and hence the density distribution in the air flowing over the body.

A basic disadvantage of the double exposure technique is that a change in the position of any component in the system by as little as a fraction of a wavelength during the interval between exposures can distort the reference fringe pattern of the interferogram making it difficult to analyze. Unfortunately the change is permanently recorded in the holograms and cannot be removed or compensated for since no adjustment of the holograms relative to each other is possible. Component position changes during the interval between exposures may result from such factors as vibration, emulsion changes and glass plate warpage during development, and mechanical repositioning errors of the developed plate.

The dual hologram technique seeks to avoid the above difficulty. In this approach the reference state and test state holograms are made on separate photographic plates. If the two plates after development are returned to precisely the same positions they occupied when exposed and are illuminated in cascade by the reference beam, the reference and test wavefronts are reconstructed and interfere to produce the desired interferogram in the same manner as for the doubly exposed hologram. While this method is subject to the same positional errors as the double exposure method, compensation for the errors is now possible through adjustment of the separate holograms relative to each other and relative to the reference beam. Further advantages of the dual hologram method are that by relative adjustment of the holograms the optical reference state surrounding the subject can easily be changed from an infinite fringe pattern to any form of finite fringe interferogram, and the fact that only one reference hologram need be made whereas, in the double exposure method, a reference exposure must be made each time a test exposure is made. The double exposure technique, however, requires hologram holding apparatus capable of precision adjustments on the order of a fraction of the wavelength of the light being used.

SUMMARY OF THE INVENTION

The purpose of the invention is to provide a dual hologram plate holder having the number of adjustments and degree of precision required in dual hologram interferometry.

The holder disclosed provides six degrees of freedom for adjustment of the position of each hologram: three degrees of translational freedom along three orthogonal axes and three degrees of rotational freedom about these axes. The apparatus comprises a rigid rectangular outer frame bounded by front and rear planes normal to a $z$-axis of symmetry, top and bottom planes normal to a $y$-axis of symmetry, and side planes normal to an $x$-axis of symmetry, the three axes being mutually perpendicular. Light passes through the apparatus in the general direction of the $z$-axis. Two identical adjustment assemblies, one for each hologram plate, face each other on opposite sides of the central $x$–$y$ plane. Each adjustment assembly comprises a rectangular outer carrier slidably supported on rods parallel to the $z$-axis to provide the $z$-axis translational adjustment. A $z$-rotator in the form of a rectangular frame is pivotably supported within the outer carrier to provide the $z$-axis rotational adjustment. A $y$-translator, also in the form of a rectangular frame, rides on rods supported by the $z$-rotator to provide the $y$-axis translational adjustment. Similarly, an $x$-axis translator rides on rods supported by the $y$-translator to provide the $x$-axis translation adjustment. Finally, an $x$–$y$ rotator, in the form of a rectangular frame, is attached at one corner to the $y$-translator by means of a ball joint to provide for rotation about the $x$-axis or the $y$-axis in response to an adjusting force applied to one or the other of the adjacent corners. A hologram holder assembly is removably attached to each of the $x$–$y$ rotators and extends toward the central $x$–$y$ plane terminating in a hologram mounting plate, whereby the two holograms when mounted are positioned close together on opposite sides of the central $x$–$y$ plane.

All of the movable members in the apparatus are adjusted by micrometers which force the member in one direction against the tension of a spring or springs acting in the opposite direction. Piezoelectric micrometers having a manual range of one-half inch, an electrical range of 4 microns, and an electrical resolution of 40 angstroms are employed for this purpose.

BRIEF DESCRIPTION OF THE DRAWINGS

FIG. 6 is a sectional detail of a hologram plate holding clip, FIG. 7 is sectional view showing the construction of the $x$–$y$ rotator spring, and FIG. 8 is a schematic showing of a typical arrangement of apparatus for dual hologram interferometry.

DETAILED DESCRIPTION

Figure 1:
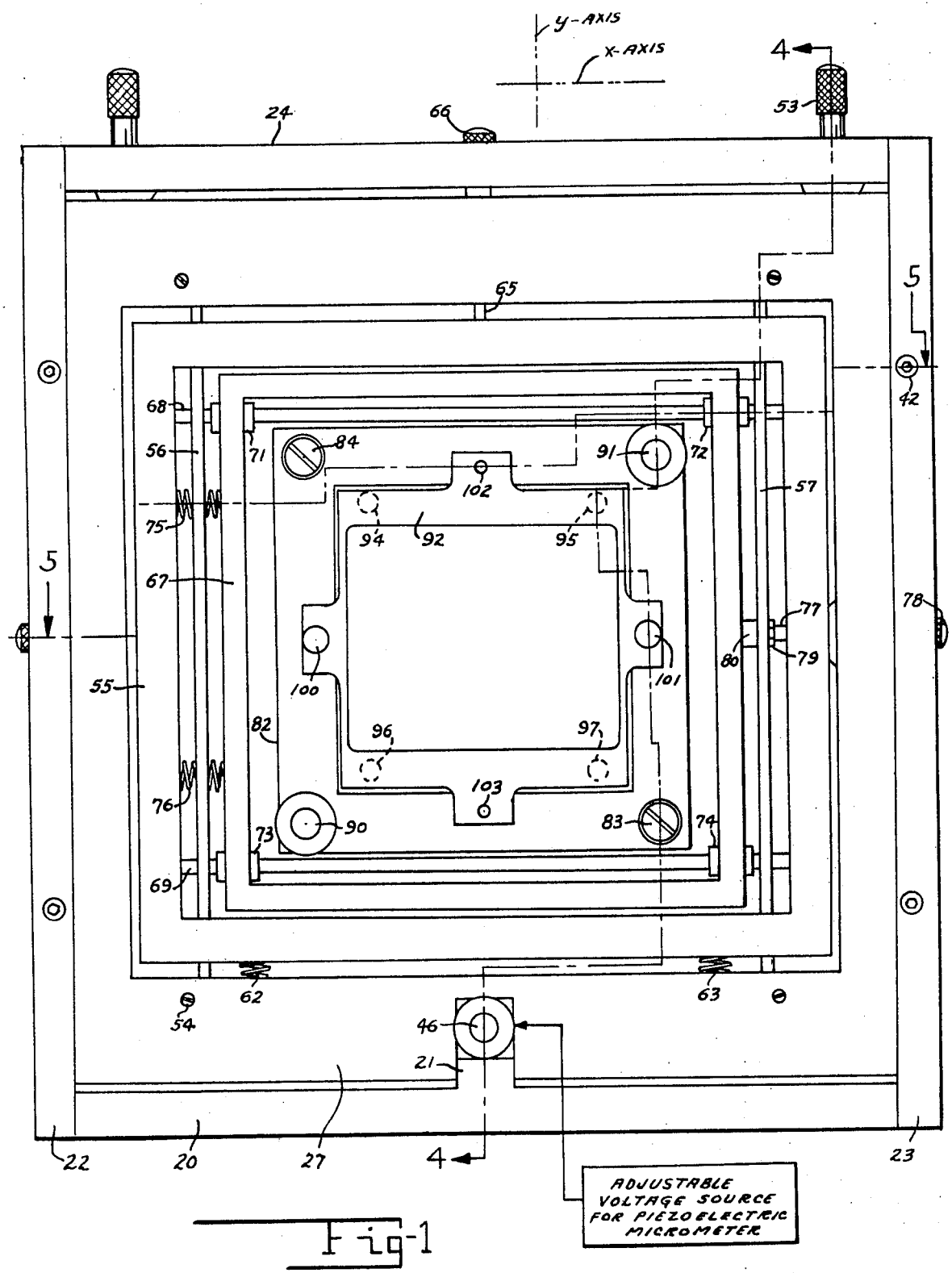
FIG. 1 is an elevation of the identical front and back of the hologram holder.

Before describing the details of the dual hologram holder, reference is made to FIG. 8 showing a typical holographic interferometry system in which the holder may be used. The source 1 of coherent light for the system may consist of a Q-switched ruby laser 2 producing a very short high intensity pulse for use in forming the holograms, and a helium-neon continuous laser 3 for use in reconstructing the wavefronts from the holograms and for observing and photographing their interference pattern. Matters are so arranged in the source 1 that both lasers have the same optical output axis. For forming the holograms a portion of the light from the laser is reflected by beam splitter 4, expanded into a collimated beam 5 of relatively large cross section by beam expander 6 and parabolic mirror 7 and used to illuminate the subject under test in the test area. The test area may be a hypersonic wind tunnel 8 and the test subject may be an aerodynamic body the airflow around which is to be studied. The dual hologram plate holder 9, which is the subject of the invention, has provision for holding and precisely adjusting two photographic plates, or after development, two holograms 10 and 11. Parabolic reflector 12 directs the light from the test area, designated the scene beam in the drawing, onto the area of the plates 10 and 11. Also the reference beam 13 from the beam splitter 4 is brought into position by plane mirrors 14 and 15, expanded into a collimated beam of relatively large cross section by elements 16 and 17, and used to illuminate the same area of plates 10 and 11 as the scene beam.

To make the holograms, a single photographic plate 10 or 11 is placed in the holder and, with the reference conditions existing in the test area, in this particular case zero wind velocity in the tunnel 8, laser 2 is pulsed to record on the plate the interference pattern between the scene beam and the reference beam, the developed plate constituting the reference hologram. In a similar manner, the second plate is exposed under test conditions, i.e., with wind at the desired velocity passing through the tunnel, and the plate developed to produce the test hologram. In order to observe or record the interference pattern between the reference and test wavefronts these wavefronts are simultaneously reconstructed by placing the two holograms in the holder and illuminating them simultaneously with the reference beam only, the reference beam in this case being supplied by continuous laser 3 which should have a wavelength equal to or near as possible to that of laser 2. The reconstructed wave-fronts, represented by the broken lines in the drawing, interfere to produce an interference pattern the fringes of which may be visually observed on screen 18 or photographically recorded by substituting a photographic plate for the screen. The precision adjustments provided by the holder permit the earlier mentioned positioning errors to be conpensated and the reference fringe pattern of the interference pattern to be controlled. The reference hologram may be used with other test conditions so that only a test hologram need be made for each different test condition.

Figure 2:
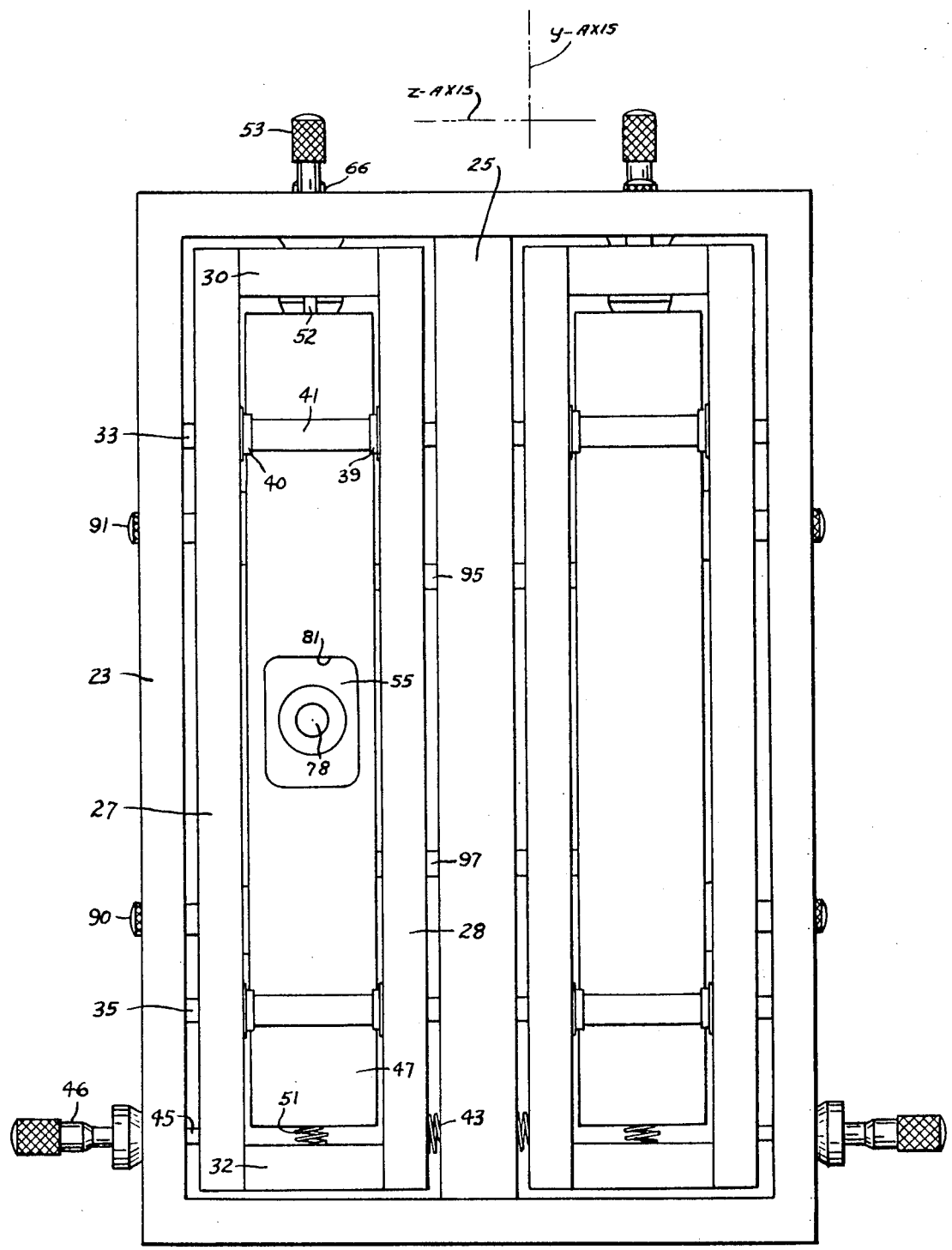
FIG. 2 is a side elevation of the holder.
Figure 3:
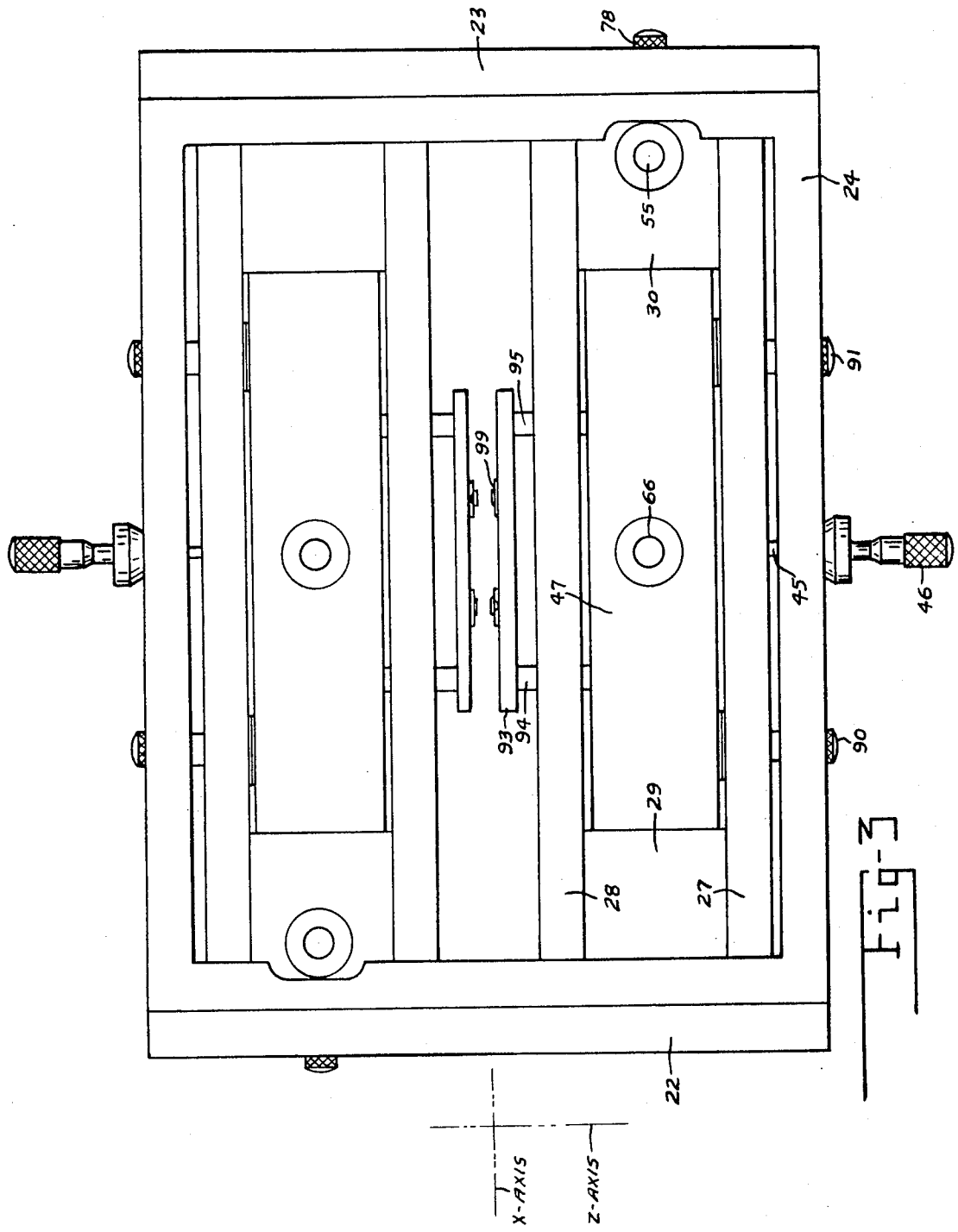
FIG. 3 is a top plan view of the hologram holder.

The constructional details of the hologram plate holder 9 are shown in FIGS. 1–7. The entire apparatus is contained within a rectangular frame and outer faces of which lie in planes normal to $x$, $y$, and $z$ orthogonal axes. The relationship of these axes to the apparatus is shown in FIGS. 1, 2 and 3. Light travels through the apparatus in the general direction of the $z$-axis. The front and back views of the apparatus are identical so that both may be represented by FIG. 1. Similarly, the side views are the same so that both sides may be represented by FIG. 2.

Figure 4:
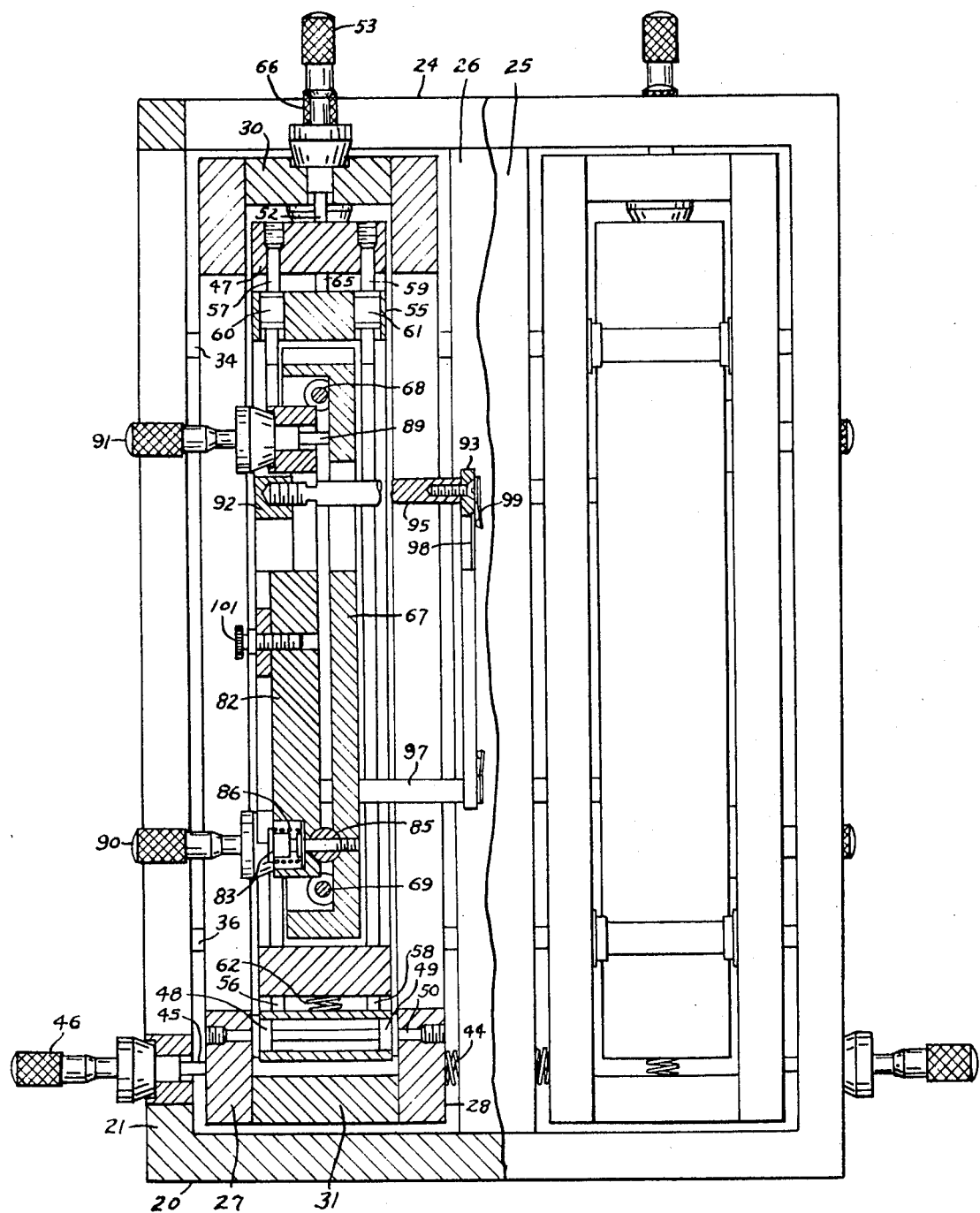
FIG. 4 is a side elevation of the holder partly in section taken along line 4—4 of FIG. 1.

The outer frame comprises a solid rectangular bottom plate 20 having at the center of the front and back edges integral raised micrometer support bases 21 as best seen in FIGS. 1 and 4, identical end plates 22 and 23 in the form of rectangular frames, and a top plate 24 in the form of a rectangular frame. Two center posts 25 and 26, seen in FIGS. 2, 4, and 5, complete the outer frame.

The central $x$–$y$ plane, which passes through the middle of center posts 25 and 26, divides the outer frame into two compartments each of which contains a complete hologram plate support and adjusting assembly. The two assemblies are identical in construction so that a description of one of them will suffice. The assembly comprises a carrier which serves as the $z$-axis translator and is made up of rectangular frames 27 and 28 separated by upper plates 29 and 30 and similar lower plates 31 and 32. The carrier is supported by shafting 33, 34, 35, and 36 on ball bushings such as 37 and 38 in FIG. 5. The bushings are retained by retaining rings such as 39 and 40 and spacing sleeve 41, also seen in FIG. 5. Precision shafting and ball bushings are employed to permit free but precise movement of the carrier along the shafts. The shafts are supported in end plates 22 and 23, in which they are retained by setscrews such as 42, and by center posts 25 and 26 through which they pass. Springs 43 and 44, as seen in FIGS. 2 and 4, react against center posts 25 and 26 to push the $z$-translator carrier away from the center posts and into contact with spindle 45 of micrometer 46 which is mounted on support base 21 and provides the $z$-axis translational adjustment.

Rotational adjustment about the $z$-axis is provided by a rectangular open frame 47 which pivots on ball bearings 48 and 49, FIG. 4, about a shaft 50 carried by the $z$-translator members 27 and 28 at the center line of frame 47. Precision ball bearings and shafting are used to provide free but precise rotation of frame 47 about shaft 50. A spring 51, seen in FIG. 2, reacting against lower plate 32 of the $z$-translator, rotates frame 47 counterclockwise against spindle 52 of micrometer 53 mounted in upper plate 30 of the $z$-translator. With this arrangement, micrometer 53 is able to precisely rotate frame 47 about shaft 50 thereby providing the $z$-axis rotational adjustment. The frame 47 is steadied within the frame of the $z$-translator by four symmetrically arranged nylon screws, such as screw 54, in rectangular frame 27 which extend through this plate and bear lightly on the side of frame 47 at both the top and the bottom. Four similar screws extend through frame 28 opposite those in frame 27 and bear lightly on the back surface of frame 47. This feature is illustrated in FIGS. 1 and 5 but omitted from the other figures for simplicity.

Translational adjustments along the $y$-axis are provided by $y$-translator frame 55 which is guided in the $y$-axis direction by shafts 56, 57, 58 and 59 along which the frame can move on precision ball bushings, two of which, numbered 60 and 61, are shown in FIG. 4. These shafts are supported by $z$-rotator frame 47 in which they are retained by setscrews, two of which are seen at the ends of shafts 57 and 59 in FIG. 4. Springs 62 and 63, seen in FIG. 1, react against the lower horizontal portion of z-rotator frame 47 continuously forcing frame 55 upward into contact with spindle 65 of micrometer 66 which is mounted in the center of the upper horizontal portion of frame 47. This micrometer provides the y-axis translational adjustment.

Figure 5:
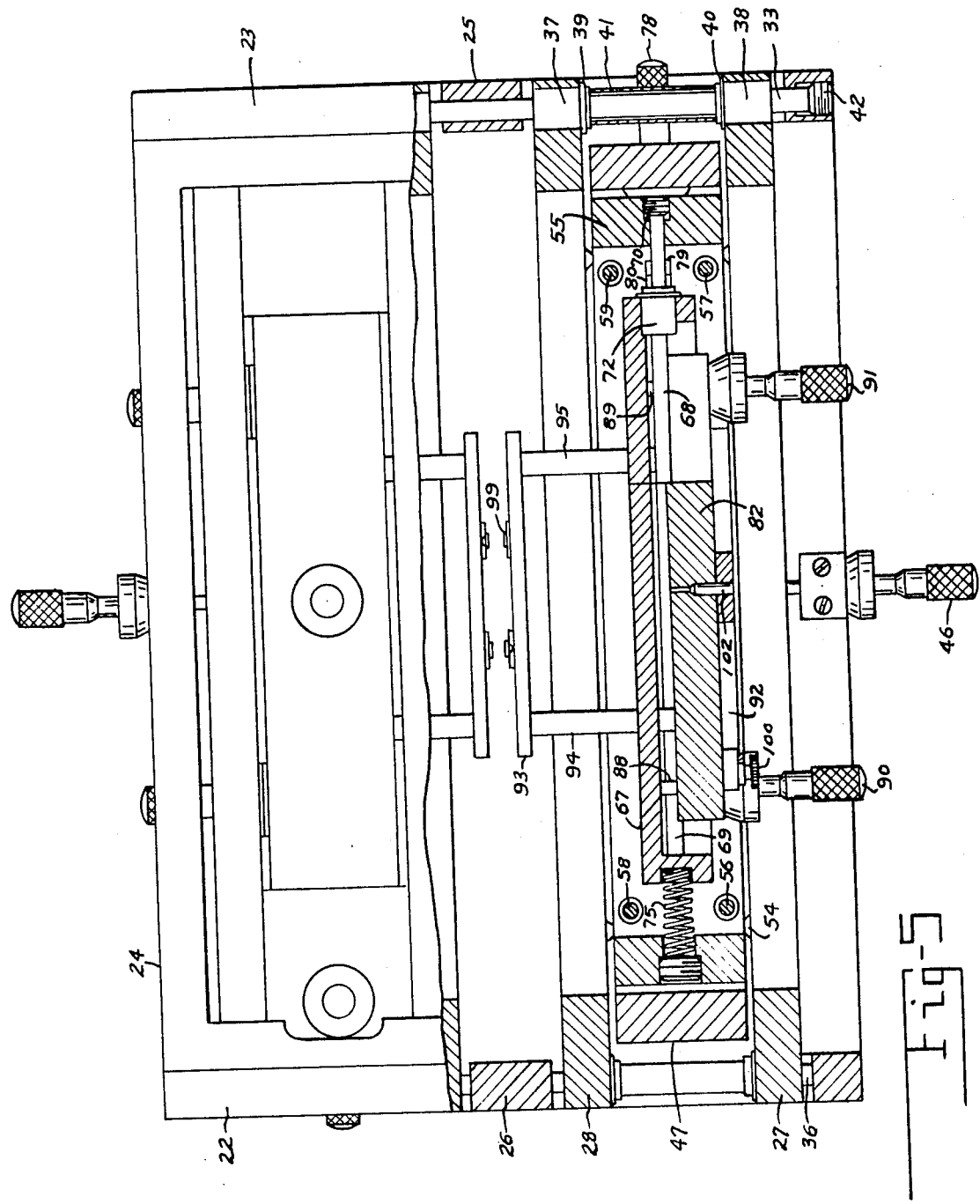
FIG. 5 is a top plan view partly in section taken along line 5—5 of FIG. 1.

The x-axis translational adjustment is provided by rectangular frame 67 having an L-shaped cross section as best seen in FIGS. 1, 4, and 5. The x-translator frame is supported within y-translator frame 55 by precision shafts 68 and 69 supported by frame 55 and retained therein by end setscrews such as setscrew 70, visible in FIG. 5. Precise movement of frame 67 along shafts 68 and 69 is provided by precision ball bushings 71, 72, 73, and 74. Springs 75 and 76 continually urge frame 67 to the right, as seen in FIG. 1, against spindle 77 of micrometer 78. Contact is made with the spindle through a rest button consisting essentially of a hexagon head screw 79 threaded into the side of frame 67 through spacer 80. The micrometer is mounted in the side of y-translator frame 55, extending through an opening 81 in z-rotator frame 47 as seen in FIG. 2, and serves as the x-axis translational adjustment device.

The final two of the six adjustments are provided by x-y rotator element 82. This element is in the form of a rectangular frame and fits partly within the recess of x-translator 67 provided by its L-shaped cross section. It is attached to x-translator 67 at opposite corners by attachments of which screws 83 and 84 are parts. Screw 83, as seen in FIG. 4, is threaded into the element 67 through ball 85 which fits into spherical recesses in elements 67 and 82. Spring 86, reacting against the underside of the head of screw 83, urges element 82 toward element 67 with sufficient force to keep ball 85 seated in elements 82 and 67 at all times. Enough clearance is provided where screw 83 passes through element 82 to permit free universal movement of element 82 over the surface of the ball within the small range of adjustment required. The attachment at screw 84 is shown in FIG. 7 and is similar to that at screw 83 without the ball. Spring 87 constantly urges element 82 toward element 67 thereby keeping the spindles 88 and 89 of micrometers 90 and 91, mounted in the two remaining corners of element 82, always in contact with x-translator element 67. Spring 86 is made stronger than spring 87 in order to prevent spring 87 from separating the ball joint by a seesawing action of element 82 about the spindle ends of micrometers 90 and 91 as pivots. The y-axis rotational adjustment is accomplished through micrometer 90 which causes frame 82 to rotate about the ball joint at screw 83 and the tip of spindle 89 of micrometer 91 as pivots. The x-axis rotational adjustment is accomplished through micrometer 91 which causes frame 82 to rotate about the ball joint and the tip of spindle 88 of micrometer 90 as pivots. The clearance between x-y rotator frame 82 and the shank of screw 84 should be the absolute minimum required to permit free movement of element 82 over its range of adjustment which is very small.

The hologram is held by a hologram support structure which is removably attached to x-y rotator frame 82. This structure consists of a base 92 which supports a hologram mounting plate 93 by means of four spacing rods 94, 95, 96, and 97 which are threaded into the base, as seen in FIGS. 1, 3, 4, and 5. Glass plate 98 which is the substrate for the hologram or photographic emulsion, as the case might be, is retained in the mounting plate 93 by means of rotatable spring glass clamps, such as clamp 99, the details of which are shown in FIG. 6. In order to facilitate the insertion and removal of the glass plates, the entire hologram support structure may be removed from the apparatus and reinserted in exactly the same position. For this purpose, the base member 92 is attached to x-y rotator 82 by means of thumbscrews 100 and 101. Reattachment in the same position is insured by positioning pins 102 and 103 carried by the x-y rotator frame 82 and accurately fitting holes in base 92.

Since positioning errors that may occur for any reason during the interval between the exposures of the reference and test holograms and that may occur as a result of removing and reinserting the glass plate for the purpose of photographic development are extremely small, the corrective adjustments required of the dual hologram holder are likewise extremely small and require very high resolution adjusting devices. For this reason piezoelectric micrometers are used for all six adjustments. These devices are commercialy available and, in addition to the usual manual adjustment over a relatively large range such as one-half inch, provide a high resolution electrical adjustment over a very narrow range. The latter is accomplished by a piezoelectric element in the micrometer which extends the spindle over a small range in proportion to the magnitude of an applied voltage. Typically, the electrical adjustment range may be 4 microns and the resolution 40 angstroms. This is illustrated schematically in FIG. 1 for micrometer 46 but is omitted in the other figures and for the other micrometers for the sake of simplicity.

Aluminum with a black anodized finish is a suitable material for construction of the dual hologram plate holder.

We claim:

1. A dual hologram plate holder comprising: an outer rectangular framework having outer faces lying in planes normal to orthogonal x, y, and z axes; two identically constructed adjustment assemblies situated within the two halves of said framework as defined by the central x-y plane, each adjustment assembly comprising: a z-translator in the form of a rectangular frame slidably supported on shafts which are in turn supported by said framework in a direction parallel to the z-axis, springs attached to said z-translator and reacting against said framework for constantly urging the z-translator along the z-axis in a direction away from said central x-y plane, and a micrometer attached to said framework and having its spindle in contact with the opposite side of the z-translator from said springs for opposing the action of the springs; a z-rotator in the form of a rectangular frame pivotable about a shaft supported by said z-translator in a direction parallel to the z-axis, a spring attached to said z-rotator at a point removed from the pivot shaft and reacting against the z-translator for exerting a constant moment on the z-rotator with respect to the pivot shaft, and a micrometer attached to said z-translator and having its spindle in contact with said z-rotator at a point where it can oppose said moment; a y-translator in the form of a rectangular frame slidable on shafts supported by said z-rotator in a direction nominally parallel to the y-axis, springs attached to said y-translator and reacting against the z-rotator for constantly urging the y-translator in one direction along the y-axis, and a micrometer attached to said z-rotator and having its spindle in contact with the opposite side of the y-translator from said springs for opposing the action of the springs; an x-translator in the form of a rectangular frame slidable on shafts supported by said y-translator in a direction nominally parallel to the x-axis, springs attached to said x-translator and reacting against the y-translator for constantly urging the x-translator in one direction along the x-axis, and a micrometer attached to said y-translator and having its spindle in contact with the opposite side of the x-translator from said springs for opposing the action of the springs; an x-y rotator in the form of a rectangular frame attached at one corner to said x-translator by means of a ball joint, a spring in contact with the x-y rotator at the corner opposite the ball joint and reacting against said x-translator for constantly urging said corner toward the x-translator frame, and micrometers attached to said x-y rotator at the remaining two corners and having their spindles in contact with the x-translator frame for opposing the action of the spring; and a hologram plate support structure removably attached to said x-y rotator, said structure comprising: a base in the form of a rectangular frame removably attachable to the x-y rotator frame by means of aligning pins and removable fasteners, four spacing rods of equal lengths extending from said base toward said central x-y plane, and a hologram plate mounting frame supported by said spacing rods near said central x-y plane.

2. Apparatus as claimed in claim 1 in which said micrometers are all of the piezoelectric type.

* * * * *